United States Patent
Martin

(10) Patent No.: US 6,889,407 B2
(45) Date of Patent: May 10, 2005

(54) SINGLE FINGER PULL CORD LOCK RELEASE

(75) Inventor: John Dietrich Martin, Vashon, WA (US)

(73) Assignee: K-2 Corporation, Vashon, WA (US)

( * ) Notice: Subject to any disclaimer, the term of this patent is extended or adjusted under 35 U.S.C. 154(b) by 0 days.

(21) Appl. No.: 10/459,106

(22) Filed: Jun. 10, 2003

(65) Prior Publication Data

US 2004/0250388 A1 Dec. 16, 2004

(51) Int. Cl.$^7$ ................................................. A43C 7/00
(52) U.S. Cl. .................................. 24/136 R; 24/712.5
(58) Field of Search ............................ 24/712.5, 712.7, 24/115 H, 136 R, 129 D, 136 L, 115 M, 129 R, 115 R; 36/50.1, 51; 403/211

(56) References Cited

U.S. PATENT DOCUMENTS

| | | | |
|---|---|---|---|
| 198,086 A | 12/1877 | Dunn | |
| 387,499 A | * 8/1888 | Earnshaw | ................. 24/136 R |
| 2,573,806 A | * 11/1951 | Paterson | ..................... 403/216 |
| 4,102,019 A | 7/1978 | Boden | |
| 4,156,574 A | 5/1979 | Boden | |
| 4,533,205 A | * 8/1985 | Frank | ......................... 439/783 |
| 4,665,590 A | * 5/1987 | Udelhofen et al. | ....... 24/115 H |
| 5,083,797 A | 1/1992 | Vartija et al. | |
| 5,280,843 A | 1/1994 | Vartija et al. | |
| 5,435,044 A | * 7/1995 | Ida | ............................ 24/136 R |
| 5,454,140 A | * 10/1995 | Murai | ....................... 24/136 R |
| 5,471,713 A | * 12/1995 | Alter et al. | ............... 24/136 R |
| 5,894,639 A | 4/1999 | Boden et al. | |
| 5,987,712 A | 11/1999 | Tucker | |

FOREIGN PATENT DOCUMENTS

| | | | |
|---|---|---|---|
| EP | 0 636 812 A1 | 2/1995 | |
| FR | 2792506 A1 | * 10/2000 | ............ A43C/7/00 |
| FR | 2802783 A1 | * 6/2001 | ............ A43C/7/00 |

* cited by examiner

Primary Examiner—James R. Brittain
(74) Attorney, Agent, or Firm—Christensen O'Connor Johnson Kindness PLLC

(57) ABSTRACT

A cord lock apparatus (100) is disclosed comprising a base (120) having a converging channel (128), and an elastically flexible locking insert (140) that is retained by the base. The locking insert defines a loop including left and right legs (146) that are generally parallel to the sidewalls (124) of the channel, and receive a cord (102) therebetween. When the locking insert is undeformed, the cord is clampingly engaged between the insert legs and the base sidewalls. The user pulls upwardly on the loop to elastically deform the insert such that the legs rotate inwardly, releasing the cord. The insert may also slide longitudinally to a limited extent in the channel. Teeth (123, 143) may be provided on the locking insert and/or the base to more securely engage the cord.

31 Claims, 3 Drawing Sheets

SINGLE FINGER PULL CORD LOCK RELEASE

FIELD OF THE INVENTION

The present invention is related to cord fasteners for releasably retaining cords and, in particular, to cord locks for holding a cord or lace in a tensioned state.

BACKGROUND OF THE INVENTION

Cord lock devices for releasably holding a cord or lace in a generally tensioned or gathered configuration, are known in the art. For example, cord lock devices are often used on fabric bags having a drawstring for closing the bag. The cord lock functions to hold, or lock, the drawstring in the closed position. Such cord lock devices are commonly used, for example, in gear bags and the like for camping and other outdoor activities. Cord lock devices are also frequently used for lacing systems for shoes, boots, and boot inserts. In a lacing system, the user can quickly tighten the lace by merely pulling upwardly on the lace or cord to achieve the desired tension, and sliding the cord lock device down over the cord to secure the cord, maintaining the tension in the cord.

In many prior art cord lock devices a rigid wedge-shaped element is disposed in a converging channel that is adapted to receive a cord therebetween. For example, in U.S. Pat. No. 198,086 to Dunn, a bag fastener is disclosed wherein a rigid wedge is disposed and biased in a case or envelope, such that a cord disposed between the wedge and case will be grasped therebetween by the biasing force of the spring. To release the cord, a user pulls up on the rigid wedge against the force of the spring to slide the wedge within the case thereby causing the sides of the wedge to move away from the sides of the case, and hence releasing the cord. The disclosed device, however, is relatively complex, requiring an embedded spring, and requires the use of rigid components, which may be relatively expensive.

Other devices that rely on the horizontal movement of a generally wedge-shaped device disposed between two sidewalls have also been proposed. For example, U.S. Pat. No. 5,894,639 to Boden et al. discloses a cord lock apparatus based on the same principal as Dunn, but wherein the spring element is formed integrally with the wedge or slide component. In U.S. Pat. No. 4,156,574, Boden discloses a somewhat similar apparatus wherein a pair of elongate arms at the top of the slide provides a biasing force through the movement of the cord to the slide. Similar devices are disclosed in U.S. Pat. No. 5,280,843 to Vartija et al, and U.S. Pat. No. 5,987,712 to Tucker. Although these prior art devices appear to perform their intended function, they all rely on moving a generally rigid, wedge-shaped element longitudinally within a converging channel or passageway, to engage or release a cord disposed therebetween.

Other cord lock devices are known wherein the user must grasp the cord lock from both sides and pinch together biased retaining members, in order to release the cord lock. A disadvantage of such cord locks is that they require that the user to grasp the device between the thumb and finger, and therefore a certain amount of dexterity is needed. The dexterity required may be particularly problematic—for example, in snow sporting applications where the user's hand may be cold and/or gloved, and the cord lock itself may be encrusted with snow.

Therefore a need remains for a relatively simple cord lock apparatus that requires minimal manual dexterity, and can be disengaged by the user with a single finger.

SUMMARY OF THE INVENTION

The present invention provides a cord lock apparatus that may be easily released using a single finger by simply pulling upwardly on a portion of the cord lock. The cord lock assembly includes a base member having a converging passageway therethrough. The passageway includes a left sidewall and a right sidewall, which sidewalls may optionally include inwardly disposed teeth. An elastically deformable locking insert is retained by the base, the insert having a lower portion disposed within the base and a portion that extends out of the base. The lower portion includes a left arm that is generally parallel to the base left sidewall and receives a portion of a cord therebetween, and a right arm that is generally parallel to the base right sidewall and receives a portion of the cord therebetween. The left and right arms may optionally include outwardly disposed teeth. A transverse member connects the upper portion of the left and right arms, such that a user can simply pull upwardly on the transverse member to cause the left and right arm to elastically deflect inwardly, to release the clamping engagement of the cord.

In an embodiment of the invention, the locking insert is formed as an integral plastic loop.

In an embodiment of the locking apparatus, the locking insert includes an end stop on the lower portion and an abutment on the upper portion, such that the locking insert can slide within the channel between a first position, where the end stop engages a lower end of the base, and a second position, wherein the abutment engages and upper end of the base.

In an embodiment of the invention, the base includes a protrusion or button that extends from the base to facilitate pushing the cord lock downwardly along the cord.

In an embodiment of the invention, the cord lock includes a flange portion such that the base is attachable to another object, such as the tongue or main shell of a boot or boot liner.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
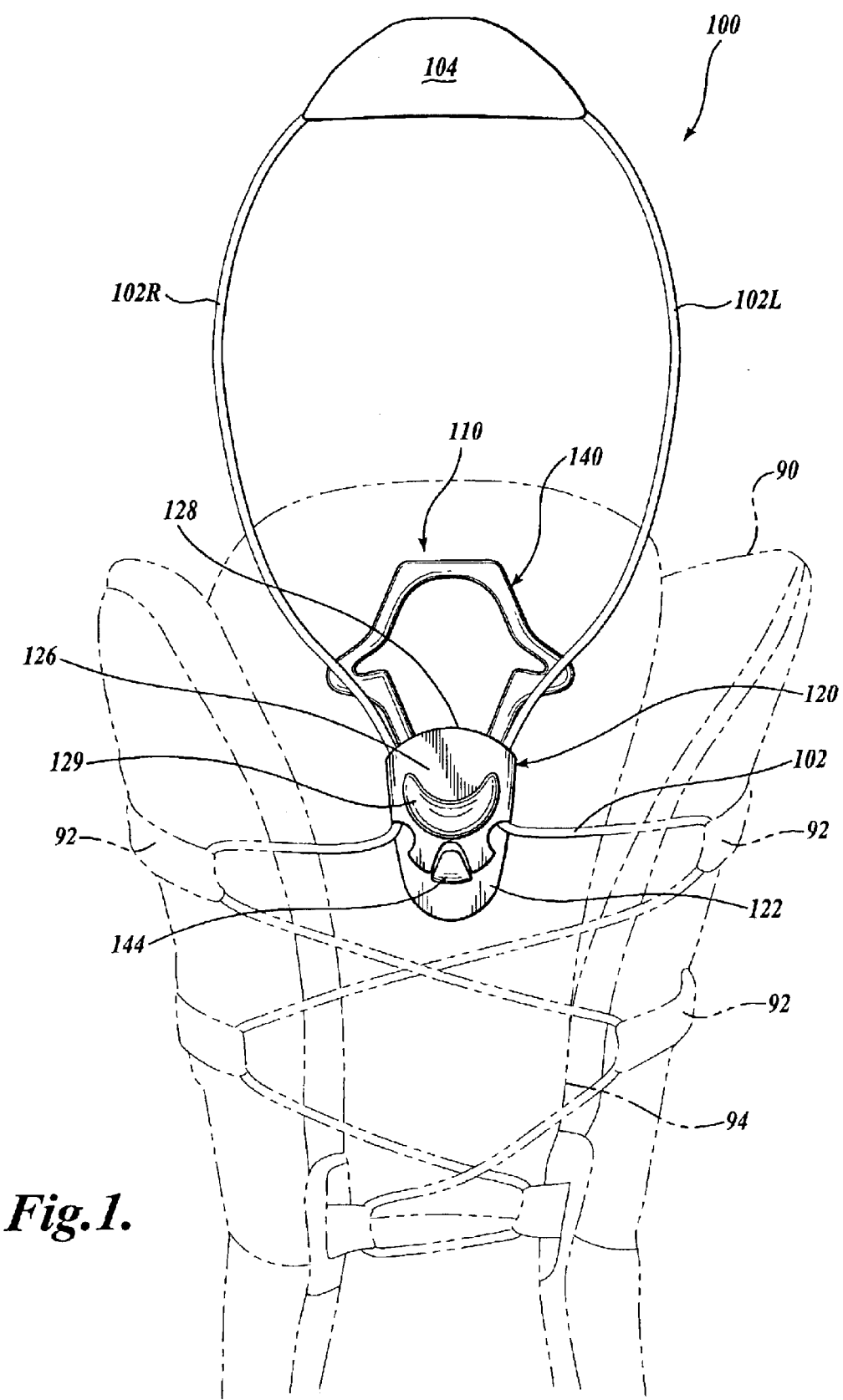
FIG. 1 is a front view of an embodiment of a cord lock assembly, according to the present invention, attached to a boot liner shown in phantom;.

An embodiment of a cord lock assembly according to the present invention will now be described with reference to the figures, wherein like numbers represent like parts. FIG.

1 shows a cord lock assembly 100 disposed on a boot liner 90 having a plurality of lace keepers 92 oppositely disposed on either side of a liner vamp portion 94. The cord lock assembly 100 includes a lace or cord 102 that slidably engages the lace keepers 92, such that tightening, or applying tension to, the cord 102 will bias the vamp portion 94 of the liner 90 toward a closed position. In this embodiment, the cord 102 is a lace having ends that are joined together with an end pull 104, after the cord is threaded through the lace keepers 92, to form a closed loop. It will be appreciated that the end pull 104 facilitates tightening the cord 102 because it permits the user to grab the cord 102 at a single position. In particular, rather than having to grab both ends of the cord 102, the user may merely insert a finger through the top of the loop formed by the cord 102, and pull upwardly to tighten the cord 102 and generally close the vamp portion 94 of the liner 90. The cord 102 and lace keepers 92 are preferable selected and designed to have minimal friction therebetween, so that the cord tension will be propagated relatively uniformly along the entire operative length of the cord 102.

The cord 102 includes a left portion 102L that is disposed generally between the leftward uppermost lace keeper 92 and the end pull 104, and a right portion 102R that is disposed generally between the rightward uppermost lace keeper 92 and the end pull 104. A cord lock 110 slidably engages both the cord left portion 102L and the cord right portion 102R, and is adapted to releasably retain the cord 102 in a tensioned state, as described in more detail below. In order to engage the cord lock 110, the user pulls, e.g., upwardly, on the end pull 104 to tension the cord 102, and pushes the cord lock 110 toward the lace keepers 92 and releases the cord lock 110 at the desired position.

Figure 2:
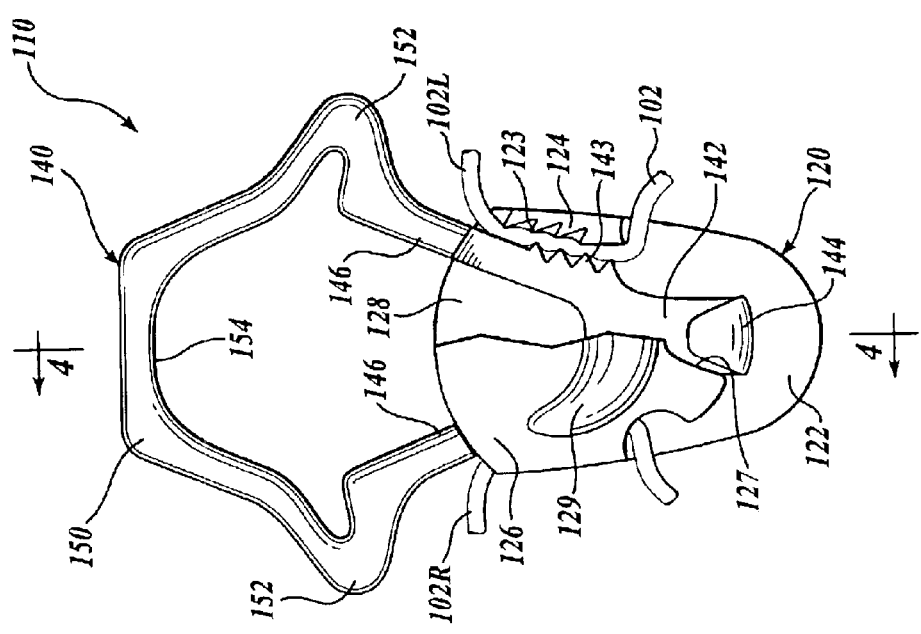
FIG. 2 is a partially cut-away front view of the cord lock assembly shown in FIG. 1.

Referring now to FIG. 2, showing a partially cut-away front view of the cord lock 110, the cord lock includes a base 120 and a locking insert 140 that is adapted to be retained by the base 120. In this particular embodiment, the cord lock 110 is generally symmetrical about its vertical centerline. The base 120 includes a generally flat back panel 122, a pair of sidewalls 124 that extend upwardly from the back panel 122, and a contoured front panel 126. The back panel 122, sidewalls 124, and front panel 126 cooperatively define a longitudinally converging channel 128 through the base 120. The sidewalls 124 include a plurality of inwardly disposed teeth 123 that are positioned to engage the cord 102. The teeth 123 in the preferred embodiment are generally directed or pointed toward the top of the cord lock 110, such that the teeth preferentially engage the cord 102 in one direction to hinder releasing tension in the cord 102, and interfere less with cord movement in the opposite direction.

The front panel 126 includes a retaining indent 127 (partially shown in FIG. 2) at its lower end that is shaped to retain the locking insert 140, as discussed below. Optionally, and as shown most clearly in FIG. 1, the front panel 126 also includes a generally crescent-shaped protrusion 129 that provides the user with a convenient gripping point to facilitate sliding the cord lock 110 downwardly along the cord 102 during tightening engagement of the cord lock 110.

Referring again to FIG. 2, the locking insert 140 includes a lower portion 142 that includes an end stop 144 that is sized to engage the retaining indent 127 in the base front panel 126, thereby preventing the locking insert 140 from pulling out of the channel 128 and disengaging with the base 120. A pair of elastically flexible arms 146 extends upwardly from the lower portion 142, at an angle that approximately corresponds with the converging sidewalls 124 of the base 120, such that each flexible arm 146 is generally parallel with a corresponding sidewall 124. The lower portion of each flexible arm 146 preferably includes a plurality of outwardly disposed teeth 143 that are adapted to engage the cord 102. A transverse member 150 connects the upper ends of the flexible arms 146. The transverse member 150 of the preferred embodiment includes oppositely disposed elbows 152 that extend outwardly from the top end of the flexible arms 146 and a hat-shaped finger pull 154 having a curved undersurface. The flexible arms 146 and transverse member 150 cooperatively define a generally pentagonal and flexible hoop.

Figure 3:
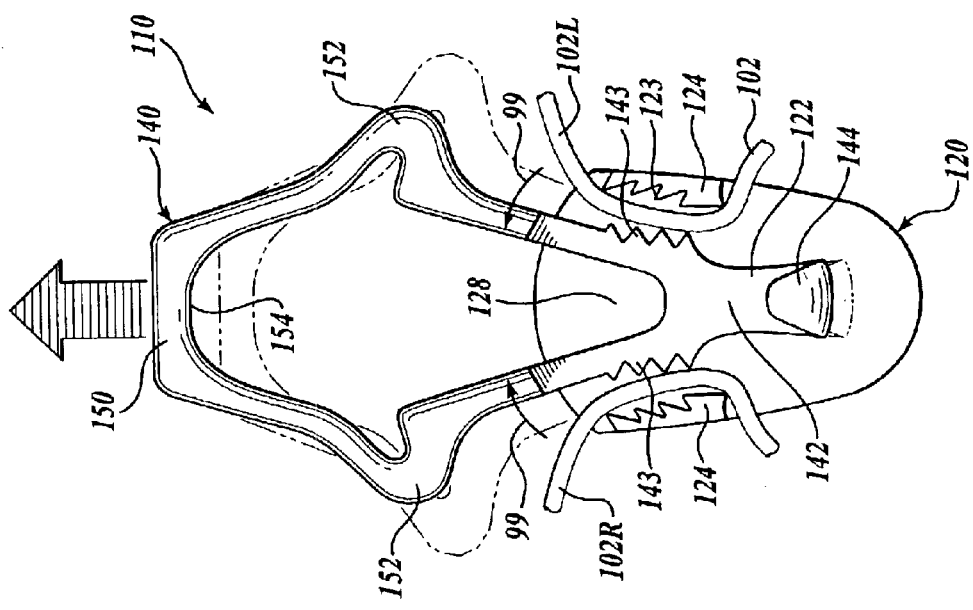
FIG. 3 is a front view of the cord lock assembly shown in FIG. 1, with the front panel of the base removed for illustrative purposes and showing the operation of the cord lock to release the cord.

FIG. 3 shows a front view of the cord lock 110, with the base front panel 126 removed for clarity, wherein the locking insert 140 is shown elastically deformed by an upward force (indicated by the large arrow) applied to the finger pull 154 portion of the locking insert 140, with the base 120 being held stationary. The lower portion 142 of the locking insert 140 is retained in the base 120 by the end stop 144, and therefore pulling upwardly on the finger pull 154, while holding the base 120 stationary will cause the flexible locking insert 140 to deform, such that the flexible arms 146 rotate inwardly, as indicated by arrows 99 and the phantom view of the undeformed insert. The inward rotation of the flexible arms 146 causes the cord retaining teeth 143 to move away from the teeth 123 of the base 120, thereby releasing the grip of the cord lock 110 on the cord portions 102L, 102R and releasing the tension in the cord 102, and permitting the user to slide the cord lock 110 upwardly on the cord 102.

Figure 4:
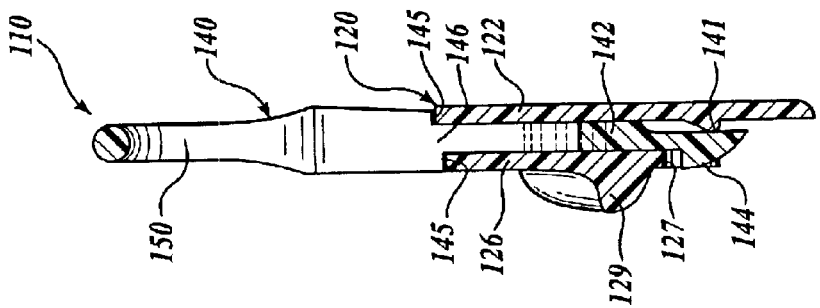
FIG. 4 is a cross-sectional side view of the cord lock shown in FIG. 1.

A side view of the cord lock 110, taken through section 4—4 in FIG. 2, is shown in FIG. 4. It can be seen that the end stop 144 abuts against the retaining indent 127 of the front panel 126 to prevent the locking insert 140 from pulling out at the top and disengaging from the base 120. A small, sloped nib 141 projects up from the back panel 122, located behind the end stop 144, to more securely bias the end stop 144 toward the front panel 126.

In the disclosed embodiment, the locking insert 140—including the lower portion 142, flexible arms 146, and transverse member 150—is unitarily formed and may be made from, for example, a semi-rigid plastic. It should be appreciated that when the cord lock 110 is retaining the tensioned cord 102, the teeth 123, 143 of the cord lock 110 engage the cord 102, and the tension in the cord 102 generally pulls downwardly on the locking insert 140, so that the cord 102 itself pulls the locking insert 140 towards the base 120, resulting in a very secure locking retention of the cord 102.

As seen most clearly in FIG. 4, the locking insert flexible arms 146 include front and back abutments 145 that are positioned to limit the downward motion of the locking insert 140 by abutting against the front or back panels 122, 126 of the base 120. Comparing FIG. 2 and FIG. 3, it will be appreciated that the end stop 144 and the abutments 145 on the locking insert 140 are positioned such that the locking insert 140 can slide longitudinally to a limited extent in the base 120, further facilitating release of the cord 102. For example, when the user inserts a finger into the aperture formed by the locking insert 140 and pulls on the finger pull 154, the inward deflection of the flexible arms 146 will cause the teeth 143 to move away from the cord 102. The entire locking insert 140 will them move upwardly (in FIG. 3) to further widen the gap between the locking insert teeth 143 and the base sidewall teeth 123, allowing the cord 102 to slide relatively freely therebetween. In the preferred embodiment, the longitudinal play in the locking insert 140 (the amount of longitudinal movement permitted by the spacing of the end stop 144 and the abutments 145) is preferably between about 2 mm and about 6 mm.

It will be appreciated that the present invention permits a user to release the cord lock 110 with a single finger. The user does not have to grasp the cord lock 110, but can merely insert a finger through the locking insert 140 and pull upwardly, away from the base 120. This may be particularly advantageous in applications where it can be difficult to grasp a small device—for example, after engaging in snow sports when the user's hands may be cold, snow and ice may be present on the cord lock 110, and the user may be wearing gloves. Moreover, by continuing to pull on the finger pull, the user not only releases the tension in the cord 102, but also the user can pull the cord lock 110 a distance upwardly along the cord 102, for example to a position that permits the user to remove the boot or liner. The simplicity of the present invention should also be appreciated. The cord lock 110 does not require any spring or other small components, and the components of the cord lock 110, the base 120, and the locking insert 140, are very simple devices, without the small, elongate protrusions found in prior art cord locks. This reduction in complexity, as compared with prior art devices, means that the cord lock 110 is relatively easy and inexpensive to produce, and will have improved reliability.

Figure 5:
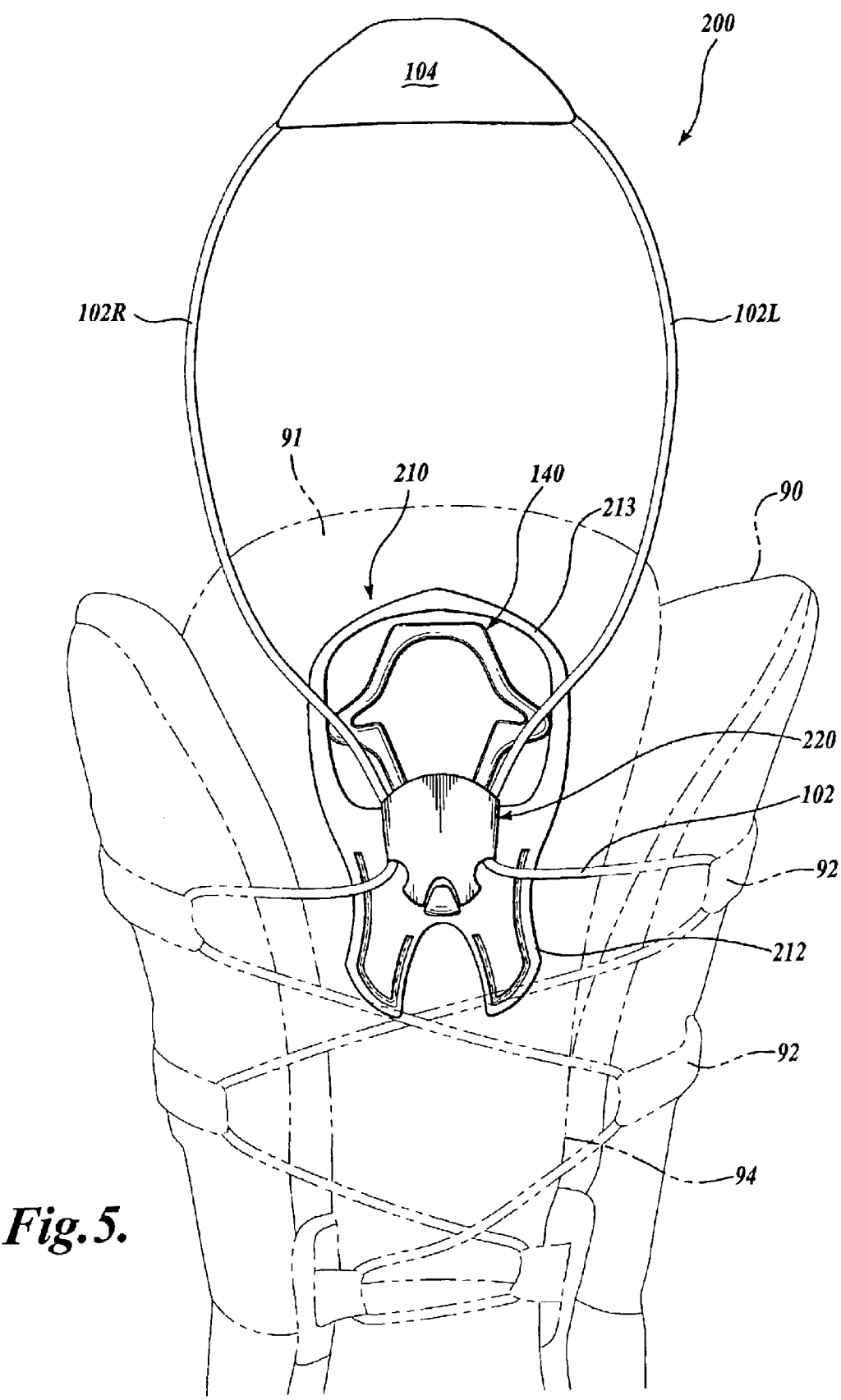
FIG. 5 is a front view of a second embodiment of a cord lock assembly, according to the present invention, attached to a boot liner shown in phantom.

A second embodiment of the present invention is the cord lock assembly 200 shown in FIG. 5. The cord lock assembly 200 includes a cord having left and right portions 102L and 102R, respectively, slidably retained by a cord lock 210. The base 220 of the cord lock 210 includes a flange 212, whereby the cord lock 210 may be fixedly attached to the tongue 91 of the liner 90 by any conventional means, including, for example, stitching, adhesive, staples, or the like. The flange 212 may be formed integrally with the back panel of the cord lock 210. A tongue pull loop 213 may optionally be included with the flange 212—for example, to facilitate pulling the tongue forward (e.g., to loosen the cord) and/or upwardly. A flexible locking insert 140 is slidably disposed within the base 220. The detailed aspects of the cord lock 210, base 220, and locking insert 140 of this embodiment are generally the same as the cord lock 110 described above, and these common features of the cord lock 210 will not be repeated here, for brevity and clarity.

It will be immediately apparent to the skilled artisan that, by attaching the base 220 to the tongue 91, the user can tighten the cord 102 with a single hand by simply pulling up on the end pull 104, and the cord lock 210 will hold the cord 102 in the tensioned condition. As described above, to release the tension in the cord 102, the user simply inserts a finger—for example, into the locking insert 140—and pulls up, causing the flexible locking insert 140 to deform and slide longitudinally, to disengage the retained cord portions 102R, 102L. The user may simultaneously engage the tongue pull loop 213 and pull forward, causing the tongue 91 to move forward through the vamp opening 94 to further loosen the lace 102.

Although the invention has been described with respect to a particular embodiment currently preferred by the inventor, it will be readily apparent that many variations in the disclosed embodiment may be made without departing from the present invention. For example, although the cord lock assembly 100 has been described with reference to a boot liner 90, the cord lock assembly may be used in any number of other applications, such as other sports boots, gear bags, and the like. Similarly, the specific shape of the locking insert 140 may be modified to achieve the same result, i.e., wherein pulling upwardly on the finger pull will cause deflection or deformation of the locking insert such that the locking elements move away from the cord. Although teeth 123 and 143 are described for engaging the cord 102, it will be apparent that other mechanisms for engaging the cord 102 may alternatively be utilized. For example, the base 120 and locking insert 140 may have appropriately placed rough surfaces or be coated with a non-slip material, or the device may simply rely on the compressive force between these components to retain the cord.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A cord lock apparatus comprising:
   a base defining a converging passageway having a left side and a right side;
   a locking insert having
   (i) a lower portion that is lockingly retained in the base passageway;
   (ii) an elastically flexible left arm having a lower end that is attached to the lower portion and an upper end that extends out of the passageway, wherein the left arm is oriented generally parallel to the left side of the passageway;
   (iii) an elastically flexible right arm having a lower end that is attached to the lower portion and an upper end that extends out of the passageway, wherein the right arm is oriented generally parallel to the right side of the passageway; and
   (iv) a flexible transverse portion connecting the upper end of the left arm with the upper end of the right arm such that the transverse portion is disposed outside of the passageway when the lower portion is lockingly retained in the base passageway; and
   a cord having a first portion disposed between the passageway left side and the locking insert left arm, and a second portion disposed between the passageway right side and the locking insert right arm;
   wherein the left arm, the right arm, and the transverse portion form a loop that is adapted to receive a user's finger, and wherein pulling upwardly on the transverse portion of the locking insert relative to the base will cause the left arm and the right arm of the locking insert to move elastically inwardly; and
   wherein the locking insert further comprises an end stop disposed on the lower portion and an abutment disposed on the upper end of at least one of the left arm and the right arm, such that the locking insert is movable between a first position wherein the end stop engages the base and a second position wherein the abutment engages the base.

2. The cord lock apparatus of claim 1, wherein the left arm and the right arm of the locking insert have outwardly disposed teeth.

3. The cord lock apparatus of claim 1, wherein the left side of the passageway and the right side of the passageway have inwardly disposed teeth.

4. The cord lock apparatus of claim 1, wherein the locking insert is an integral unit.

5. The cord lock apparatus of claim 1, wherein the locking insert is plastic.

6. The cord lock apparatus of claim 1, wherein the distance between the first position and the second position is between about 2 mm and about 6 mm.

7. The cord lock apparatus of claim 1, wherein the base further comprises a protrusion that extends forwardly from the base that facilitates pushing downwardly on the base.

8. The cord lock apparatus of claim 1, wherein the base further comprises an attachment flange.

9. The cord lock apparatus of claim 8, further comprising a tongue pull loop fixedly attached to the attachment flange.

10. The cord lock apparatus of claim 1, wherein the transverse member further comprises oppositely disposed, outwardly extending elbows.

11. A cord lock apparatus comprising:
   a base defining a converging passageway having a left side and a right side;
   a locking insert defining an elastically deformable loop adapted to receive a user's finger, the loop having a tapered portion disposed in the base passageway and an upper portion extending outside of the base, the loop having a left arm disposed generally parallel to the left side of the base passageway defining a left channel therebetween, and a right arm disposed generally parallel to the right side of the base passageway defining a right channel therebetween and an upper transverse portion connecting the distal end of the left arm and the right arm, the transverse portion being disposed outside of the passageway, the locking insert further including a retaining member that lockingly engages the base; and
   a cord having a right portion disposed in the right channel and a left portion disposed in the left channel;
   wherein the left channel is sized to clampingly engage the cord left portion when the locking insert is elastically undeformed.

12. The cord lock apparatus of claim 11, wherein the left arm and the right arm of the loop have outwardly disposed teeth.

13. The cord lock apparatus of claim 12, wherein the left channel and the right channel have inwardly disposed teeth.

14. The cord lock apparatus of claim 11, wherein the locking insert is an integral unit.

15. The cord lock apparatus of claim 14, wherein the locking insert is plastic.

16. The cord lock apparatus of claim 11, wherein the locking insert retaining member comprises an end stop disposed at a bottom end of the loop and the locking member further defines an abutment disposed on the upper portion of the loop such that the locking insert is movable between a first position wherein the end stop engages the base and a second position wherein the abutment engages the base.

17. The cord lock apparatus of claim 16, wherein the distance between the first position and the second position is between about 2 mm and about 6 mm.

18. The cord lock apparatus of claim 11, wherein the base further comprises a protrusion that extends forwardly from the base that facilitates pushing downwardly on the base.

19. The cord lock apparatus of claim 11, wherein the base further comprises an attachment flange.

20. The cord lock apparatus of claim 19, wherein the base further comprises a tongue pull loop.

21. The cord lock apparatus of claim 11, wherein the loop further comprises a hat-shaped upper portion defining oppositely disposed, outwardly extending elbows.

22. A cord lock apparatus comprising:
   a base defining a converging passageway having a left side and a right side;
   a locking insert having
      (i) a lower portion that is lockingly retained in the base passageway;
      (ii) an elastically flexible left arm having a lower end that is attached to the lower portion and an upper end that extends out of the passageway, wherein the left arm is oriented generally parallel to the left side of the passageway;
      (iii) an elastically flexible right arm having a lower end that is attached to the lower portion and an upper end that extends out of the passageway, wherein the right arm is oriented generally parallel to the right side of the passageway; and
      (iv) a flexible transverse portion connecting the upper end of the left arm with the upper end of the right arm; and
   a cord having a first portion disposed between the passageway left side and the locking insert left arm, and a second portion disposed between the passageway right side and the locking insert right arm;
   wherein the transverse member further comprises oppositely disposed, outwardly extending elbows; and
   wherein pulling upwardly on the transverse portion of the locking insert relative to the base will cause the left arm and the right arm of the locking insert to move elastically inwardly.

23. The cord lock apparatus of claim 22, wherein the left arm and the right arm of the locking insert have outwardly disposed teeth.

24. The cord lock apparatus of claim 22, wherein the left side of the passageway and the right side of the passageway have inwardly disposed teeth.

25. The cord lock apparatus of claim 22, wherein the locking insert is an integral unit.

26. The cord lock apparatus of claim 22, wherein the locking insert is plastic.

27. The cord lock apparatus of claim 22, wherein the locking insert further comprises an end stop disposed on the lower portion and an abutment disposed on the upper end of at least one of the left arm and the right arm, such that the locking insert is movable between a first position wherein the end stop engages the base and a second position wherein the abutment engages the base.

28. The cord lock apparatus of claim 27, wherein the distance between the first position and the second position is between about 2 mm and about 6 mm.

29. The cord lock apparatus of claim 22, wherein the base further comprises a protrusion that extends forwardly from the base that facilitates pushing downwardly on the base.

30. The cord lock apparatus of claim 22, wherein the base further comprises an attachment flange.

31. The cord lock apparatus of claim 30, further comprising a tongue pull loop fixedly attached to the attachment flange.

* * * * *